United States Patent [19]

Tsutsui et al.

[11] Patent Number: 5,204,419
[45] Date of Patent: Apr. 20, 1993

[54] PROCESS FOR POLYMERIZING OLEFINS

[75] Inventors: Toshiyuki Tsutsui, Ohtake; Akinori Toyota; Norio Kashiwa, both of Iwakuni, all of Japan

[73] Assignee: Mitsui Petrochemical Industries, Ltd., Tokyo, Japan

[21] Appl. No.: 231,854

[22] PCT Filed: Nov. 19, 1987

[86] PCT No.: PCT/JP87/00898

§ 371 Date: Aug. 11, 1988

§ 102(e) Date: Aug. 11, 1988

[87] PCT Pub. No.: WO88/03932

PCT Pub. Date: Jun. 2, 1988

[30] Foreign Application Priority Data

Nov. 20, 1986 [JP] Japan .................. 61-275191

[51] Int. Cl.$^5$ .................. C08F 4/642; C08F 10/00
[52] U.S. Cl. .................. 526/153; 502/103; 526/348; 526/348.4; 526/351; 526/160
[58] Field of Search .................. 526/153

[56] References Cited

U.S. PATENT DOCUMENTS

| | | | |
|---|---|---|---|
| 3,242,099 | 3/1966 | Manyik et al. | 526/153 |
| 4,404,344 | 9/1983 | Linn et al. | 526/160 |
| 4,490,514 | 12/1984 | Hoff et al. | |
| 4,530,914 | 7/1985 | Ewen et al. | 526/114 |
| 4,542,199 | 9/1985 | Kaminsky et al. | 526/160 |
| 4,564,647 | 1/1986 | Hayashi et al. | 523/211 |
| 4,618,662 | 10/1986 | Nowlin | 526/129 |
| 4,701,432 | 10/1987 | Welborn, Jr. | 502/113 |
| 4,791,180 | 12/1988 | Turner | 526/160 |

FOREIGN PATENT DOCUMENTS

| | | |
|---|---|---|
| 220436 | 2/1959 | Australia . |
| 129368 | 6/1983 | European Pat. Off. . |
| 1947588 | 9/1969 | Fed. Rep. of Germany . |

OTHER PUBLICATIONS

Matkovshii, et al., Polymer Science (USSR), vol. 16, No. 1 (1974), pp. 207-215.

Primary Examiner—Edward J. Smith
Attorney, Agent, or Firm—Sherman and Shalloway

[57] ABSTRACT

The present invention relates to a process for polymerizing olefins.

In the process of the present invention, olefins are polymerized using a catalyst composed of a compound of a transition metal (e.g. zirconium) of Group IVB of the periodic table, an aluminoxane produced from trimethylaluminum, and an aluminoxane wherein at least one hydrocarbon group other than n-alkyl groups is bonded to an aluminum atom. The present process can polymerize olefins with excellent polymerization activity and can produce an olefin polymer having a relatively large molecular weight even when the use amount of the aluminoxane produced from trimethylaluminum (which is expensive) is small.

18 Claims, No Drawings

PROCESS FOR POLYMERIZING OLEFINS

TECHNOLOGICAL FIELD

The present invention relates to a process for polymerizing olefins. Specifically, the present invention relates to a process for polymerizing olefins with excellent polymerization activity to produce an olefin polymer having a large molecular weight. More specifically, the present invention relates to a process for producing an olefin polymer having a narrow molecular weight distribution and, when applied to the copolymerization of at least two olefins, an olefin copolymer having a narrow molecular weight distribution and a narrow composition distribution, with excellent polymerization activity.

BACKGROUND TECHNOLOGY

For the production of an alpha-olefin polymer, particularly an ethylene polymer or an ethylene/alpha-olefin copolymer, methods have previously been known in which ethylene is polymerized, or ethylene and an alpha-olefin are copolymerized, in the presence of a titanium-based catalyst comprising a titanium compound and an organoaluminum compound or a vanadium-based catalyst comprising a vanadium compound and an organoaluminum compound.

On the other hand, catalysts comprising a zirconium compound and an aluminoxane have been proposed recently as a new type of Ziegler catalyst for olefin polymerization.

Japanese Laid-Open Patent Publication No. 19309/1983 describes a process which comprises polymerizing ethylene and at least one alpha-olefin having 3 to 12 carbon atoms at a temperature of $-50°$ to $200°$ C. in the presence of a catalyst composed of a transition metal-containing catalyst represented by the following formula $$(\text{cyclopentadienyl})_2\text{MeRHal}$$

wherein R represents cyclopentadienyl, $C_1-C_6$ alkyl or halogen, Me represents a transition metal, and Hal represents halogen, and a linear aluminoxane represented by the following formula $$Al_2OR_4(Al(R)-O)_n$$

wherein R represents methyl or ethyl, and n is the number of 4 to 20, or a cyclic aluminoxane represented by the following formula

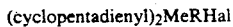

wherein R and n have the same definitions as given above.

This patent document states that in order to adjust the density of the resulting polyethylene, ethylene should be polymerized in the presence of a small amount (up to 10% by weight) of a slightly long-chain alpha-olefin or a mixture thereof.

Japanese Laid-Open Patent Publication No. 95292/1984 describes an invention relating to a process for producing a linear aluminoxane represented by the following formula

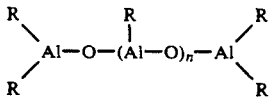

wherein n is 2 to 40 and R is $C_1-C_6$ alkyl, and a cyclic aluminoxane represented by the following formula

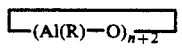

wherein R and n have the same definitions as given above.

This publication states that when an olefin is polymerized using a mixture of, for example, methylaluminoxane produced by the above process with a bis(cyclopentadienyl) compound of titanium or zirconium, a polyethylene is obtained in an amount of at least 25 million grams per gram of the transition metal per hour.

Japanese Laid-Open Patent Publication No. 35005/1985 discloses a process for producing a catalyst for polymerization of olefins, which comprises reacting an aluminoxane compound represented by the following formula

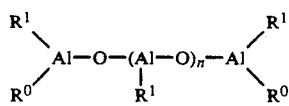

wherein $R^1$ represents $C_1-C_{10}$ alkyl, and $R^0$ is $R^1$ or is bonded to represent $-O-$, with a magnesium compound, then chlorinating the reaction product, and treating the chlorinated product with a compound of Ti, V, Zr or Cr. The above publication describes that the above catalyst is especially suitable for the copolymerization of ethylene with a $C_3-C_{12}$ alpha-olefin mixture.

Japanese Laid-Open Patent Publication No. 35006/1985 discloses a combination of (a) at least two different compounds selected from a mono-, di- or tricyclopentadienyl compound of transition metals or its derivative with (b) an alumoxane (an aluminoxane) as a catalyst system for blending polymers in a reactor. Example 1 of this publication discloses that a polyethylene having a number average molecular weight of 15,300 and a weight average molecular weight of 36,400 and containing 3.4 mole % of a propylene component was obtained by polymerizing ethylene and propylene using bis(pentamethylcyclopentadienyl)dimethylzirconium and an alumoxane as a catalyst. In Example 2 of this publication, a blend of a polyethylene and an ethylene/propylene copolymer having a number average molecular weight of 2,000, a weight average molecular weight of 8,300 and a propylene component content of 7.1 mole % and consisting of a toluene-soluble portion having a number average molecular weight of 2,200, a weight average molecular weight of 11,900 and a propylene component content of 30 mole % and a toluene-insoluble portion having a number average molecular weight of 3,000, a weight average molecular weight of 7,400 and a propylene component content of 4.8 mole % was obtained by polymerizing ethylene and propylene using bis(pentamethylcyclopentadienyl)zirconium dichloride, bis(methylcyclopentadienyl)zirconium dichloride and an alumoxane as a catalyst. Likewise, Example 3 of this publication describes a blend of a LLDPE and an ethylene/propylene copolymer composed of a soluble portion having a molecular weight distribution ($\overline{Mw}/\overline{Mn}$) of 4.57 and an propylene content of 20.6 mole % and an insoluble portion having a molecular weight distribution of 3.04 and a propylene component content of 2.9 mole %.

Japanese Laid-Open Patent Publication No. 35007/1985 describes a process which comprises polymerizing ethylene alone or with an alpha-olefin having at least 3 carbon atoms in the presence of a catalyst system comprising a metallocene and a linear alumoxane represented bu the following formula

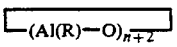

wherein R represents an alkyl group having 1 to 5 carbon atoms and n has the same definition as given above.

The publication describes that the polymer obtained by the above process has a weight average molecular weight of about 500 to about 1,400,000 and a molecular weight distribution of 1.5 to 4.0.

Japanese Laid-Open Patent Publication No. 35008/1985 describes that a polyethylene or a copolymer of ethylene and a $C_3$-$C_{10}$ alpha-olefin having a wide molecular weight distribution is produced by using a catalyst system comprising at least two types of metallocenes and an alumoxane. The publication states that the above copolymer has a molecular weight distribution ($\overline{Mw}/\overline{Mn}$) of 2 to 50.

Furthermore, Japanese Laid-Open Patent Publications Nos. 260602/1985 and 130604/1985 propose a process for polymerizing olefins using catalysts formed from a transition metal compound and a mixed organoaluminum compound composed of an aluminoxane and an organoaluminum compound. The publications state that the addition of the organoaluminum compound gives increased polymerization activity.

DISCLOSURE OF THE INVENTION

An object of the present invention is to provide an industrially advantageous process for olefin polymerization which can polymerize olefins using a relatively small amount of an expensive aluminoxane but with excellent polymerization activity.

A further object of the present invention is to provide a process for producing an olefin homopolymer having a narrow molecular weight distribution or an olefin copolymer having a narrow molecular weight distribution and a narrow composition distribution, particularly an ethylene-alpha-olefin copolymer having a narrow molecular weight distribution and a narrow composition distribution, with excellent polymerization activity.

A still further object of the present invention is to provide a process for olefin polymerization which can provide an olefin homopolymer or copolymer as mentioned above, having a relatively large molecular weight.

Other objects and advantages of the present invention will become apparent from the following explanation.

These objects and advantages of the present invention can be achieved by a process for polymerizing olefins, characterized by polymerizing or copolymerizing olefins in the presence of a catalyst composed of (A) a compound of a transition metal of Group IVB of the periodic table, (B) an aluminoxane produced from trimethylaluminum, and (C) an aluminoxane wherein at least one hydrocarbon group other than n-alkyl groups is bonded to an aluminum atom.

The present invention is explained in detail below.

In the present invention, the term "polymerization" means in some cases not only homopolymerization but also copolymerization, and the term "polymer" means in some cases not only a homopolymer but also a copolymer.

The catalyst component (A) used in the process of the present invention is a compound of a transition metal of Group IVB of the periodic table. Specifically, it is a compound of a transition metal selected from the group consisting of titanium, zirconium and hafnium. The transition metal in the catalyst component (A) is preferably titanium or zirconium, especially preferably zirconium.

As the compound of the transition metal of Group IVB of the periodic table in the catalyst component (A), there can be mentioned a zirconium compound having a group with a conjugated $\pi$-electron as a ligand.

Examples of the zirconium compound having a group with a conjugated $\pi$-electron as a ligand are compounds represented by the following formula (I)

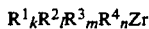

wherein $R^1$ represents a cycloalkadienyl group, $R^2$, $R^3$ and $R^4$ are identical or different and each represents a cycloalkadienyl group, an aryl group, an alkyl group, an aralkyl group, a halogen atom or a hydrogen atom, $k \geq 1$, and $k+l+m+n=4$.

Examples of the cycloalkadienyl group are a cyclopentadienyl group, a methylcyclopentadienyl group, an ethylcyclopentadienyl group, a dimethylcyclopentadienyl group, an indenyl group and a tetrahydroindenyl group. Examples of the alkyl group represented by $R^2$, $R^3$ and $R^4$ are a methyl group, an ethyl group, a propyl group, an isopropyl group and a butyl group. Examples of the aryl group are a phenyl group and a tolyl group. Examples of the aralkyl group are a benzyl group and a neophil group. Examples of the halogen atom are fluorine, chlorine and bromine. Examples of the zirconium compound are as follows.

bis(Cyclopentadienyl)zirconium monochloride monohydride,
bis(cyclopentadienyl)zirconium monobromide monohydride,
bis(cyclopentadienyl)methylzirconium hydride,
bis(cyclopentadienyl)ethylzirconium hydride,
bis(cyclopentadienyl)phenylzirconium hydride,
bis(cyclopentadienyl)benzylzirconium hydride,
bis(cyclopentadienyl)neopentylzirconium hydride,
bis(methylcyclopentadienyl)zirconium monochloride monohydride,
bis(indenyl)zirconium monochloride monohydride,
bis(cyclopentadienyl)zirconium dichloride,
bis(cyclopentadienyl)zirconium dibromide,
bis(cyclopentadienyl)methylzirconium monochloride,
bis(cyclopentadienyl)ethylzirconium monochloride,
bis(cyclopentadienyl)cyclohexylzirconium monochloride,
bis(cyclopentadienyl)phenylzirconium monochloride,
bis(cyclopentadienyl)benzylzirconium monochloride, bis(methylcyclopentadienyl)zirconium dichloride,
bis(indenyl)zirconium dichloride,
bis(indenyl)zirconium dibromide,
bis(cyclopentadienyl)diphenylzirconium,
bis(cyclopentadienyl)dibenzylzirconium, and
bis(cyclopentadienyl)dimethylzirconium.

There can also be mentioned a zirconium compound having a multidentate ligand in which at least two groups selected from the group consisting of an indenyl group, a substituted indenyl group and its partial hydrogenation product are bonded to each other via a lower alkylene group. Examples of such a zirconium compound are as follows.
Ethylenebis(indenyl)dimethylzirconium,
ethylenebis(indenyl)diethylzirconium,
ethylenebis(indenyl)diphenylzirconium,
ethylenebis(indenyl)methylzirconium monochloride,
ethylenebis(indenyl)ethylzirconium monochloride,
ethylenebis(indenyl)methylzirconium monobromide,
ethylenebis(indenyl)zirconium dichloride,
ethylenebis(indenyl)zirconium dibromide,
ethylenebis(4,5,6,7-tetrahydro-1-indenyl)dimethylzirconium,
ethylenebis(4,5,6,7-tetrahydro-1-indenyl)methylzirconium monochloride,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride, and
ethylenebis(4,7-dimethoxy-1-indenyl)zirconium dichloride.

The catalyst component (B) used in the process of the present invention is an aluminoxane produced form trimethylaluminum. It is specifically an aluminoxane produced from the reaction of trimethylaluminum with water. Examples of the aluminoxane used as the catalyst component (B) are organoaluminum compounds represented by the following general formula (III)

$$(CH_3)Al-(OAl)_m-OAl(CH_3)_2 \quad (II)$$
$$\phantom{(CH_3)Al-(OAl)_m-OAl(CH_3}|$$
$$\phantom{(CH_3)Al-(OAl)_m-OAl(CH}CH_3$$

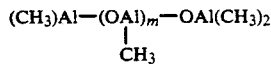
(III)

wherein m is the number of 2 or larger, preferably 5 or larger, especially preferably 6 to 40.

The catalyst component (C) used in the process of the present invention is an aluminoxane wherein at least one hydrocarbon group other than n-alkyl groups are bonded to an aluminum atom.

The aluminoxane is specifically an aluminoxane produced from the reaction of an aluminum compound having at least one hydrocarbon group other than n-alkyl groups with water. Examples of the hydrocarbon groups other than n-alkyl groups are branched alkyl groups (e.g. isoalkyl), cycloalkyl groups and aryl groups. Specific examples of the aluminum compound are trialkylaluminums such as triisopropylaluminum, triisobutylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum; tricycloalkylaluminums such as tricyclohexylaluminum; triarylaluminums such as triphenylaluminum and tritolylaluminum; dialkylaluminum hydrides such as diisobutylaluminum hydride; and alkyl aluminum alkoxides such as isobutylaluminum methoxide, isobutylaluminum ethoxide and isobutylaluminum isopropoxide. Of these organoaluminum compounds, there are preferred aluminum compounds having at least one branched alkyl group, particularly trialkylaluminum compounds. There are also preferred isoprenylaluminums represented by the general formula

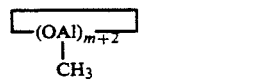

wherein X, y and z are each a positive integer of $z \geq 2x$.

The catalyst components (B) and (C) can be produced by, for example, the following methods.

(1) A method which comprises suspending a compound containing water of adsorption or a salt containing water of crystallization, such as magnesium chloride hydrate, copper sulfate hydrate, aluminum sulfate hydrate, nickel sulfate hydrate or cerous chloride hydrate in a hydrocarbon, and reacting it with a trialkylaluminum.

(2) A method which comprises reacting a trialkylaluminum directly with water in a medium such as benzene, toluene, ethyl ether or tetrahydrofuran.

It is preferred to adopt the method (1). Incidentally, the catalyst components (B) and (C) may contain a small amount of an organometallic component.

In the process of the present invention, the catalyst components (A), (B) and (C) may be separately fed into the reaction system. Or, it is possible to add a premixture of any two of the above components and the remaining one catalyst component separately into the reaction system. Alternatively, all of the catalyst components (A), (B) and (C) may be premixed and then fed into the reaction system. When two catalyst components are to be mixed in advance, the catalyst components to be mixed are preferably the catalyst components (A) and (B).

In the premixing of the catalyst components (A) and (B), the concentration of the transition metal atom is usually $2.5 \times 10^{-4}$ to $1.5 \times 10^{-1}$ milligram-atom/liter, preferably $5.0 \times 10^{-4}$ to $1.0 \times 10^{-1}$ milligram-atom/liter. The concentration of the aluminoxane is usually 0.05 to 5 gram-atoms/liter, preferably 0.1 to 3 gram-atoms/liter, as Al atom. The temperature in the premixing is usually $-50°$ to $100°$ C., and the mixing time is usually 0.1 minute to 50 hours.

The amount of the transition metal compound (A) at the time of preforming the process of the present invention is, in terms of the concentration of the transition metal atom in the polymerization reaction system, $10^{-8}$ to $10^{-2}$ gram-atom/liter, preferably $10^{-7}$ to $10^{-3}$ gram-atom/liter.

In the process of the present invention, the amount of the aluminoxane as the catalyst component (B), calculated as the aluminum atom in the reaction system, is not more than 3 milligram-atoms/liter, especially preferably 0.02 to 1 milligram-atom/liter. The proportion of the aluminum atom of the catalyst component (B) based on the total amount of the aluminum atoms of the catalyst component (B) and the catalyst component (C) in the reaction system is usually 5 to 80%, preferably 10 to 75%, especially preferably 15 to 70%. The proportion of the aluminum atom of the catalyst component (C) on the same basis is usually 20 to 95%, preferably 25 to 90%, especially preferably 30 to 85%. In the process of the present invention, the ratio of the total amount of the aluminum atoms in the catalyst component (B) and the catalyst component (C) to the transition metal atom in the reaction system is usually from 20 to 10,000, preferably from 50 to 5,000, especially preferably from 100 to 2,000.

The process of the present invention is effectively for the production of olefin polymers, particularly an ethylene polymer and an ethylne-alpha-olefin copolymer. Examples of the olefins that can be utilized in the present invention are ethylene and alpha-olefins having 3 to 20 carbon atoms, such as propylene, 1-butene, 1-hexene, 4-methyl-1-pentene, 1-octene, 1-decene, 1-dodecene, 1-tetradecene, 1-hexadecene, 1-octadecene and 1-eicocene. As necessary, polyenes such as diene can be used as a comonomer.

In the process of the present invention, olefin polymerization is usually conducted in a gas-phase or in a liquid-phase, for example, in a solution. In the liquid-phase polymerization, an inert hydrocarbon may be used as a solvent. It is also possible to use an olefin itself as the solvent.

Specific examples of the hydrocarbon medium are aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and gas oil.

In the process of the present invention, the polymerization temperature is usually −50° to 200° C., preferably 0° to 120° C. The polymerization pressure is usually atmospheric pressure to 100 kg/cm$^2$, preferably atmospheric pressure to 50 kg/cm$^2$. The polymerization may be carried out batchwise, semicontinuously or continuously. It is possible to conduct the polymerization in two or more stages having different reaction conditions. The molecular weight of the polymer obtained can be controlled by hydrogen and the polymerization temperature.

The process for olefin polymerization according to the present invention has a feature that the process, as compared with the conventional processes, can produce a polymer having a large molecular weight when it is applied particularly to ethylene polymerization or ethylene-alpha-olefin copolymerization. Further, the process can produce an olefin copolymer having a narrow molecular weight distribution and a narrow component distribution when it is applied to copolymerization of at least two olefins.

EXAMPLES

The process of the present invention will now be specifically illustrated by the following examples. The $\bar{M}w/\bar{M}n$ value was measured by the following procedure in accordance with Takeuchi, "Gel Permeation Chromatography", published by Maruzen Co., Ltd.

(1) By using a standard polystyrene of a known molecular weight (monodisperse polystyrene produced by Toyo Soda Co., Ltd.), the molecular weight M and its GPC (gel permeation chromatograph) count are measured. A calibration curve of the molecular weight M versus EV (elution volume) is prepared. The concentration at this time is adjusted to 0.02% by weight.

(2) The GPC chromatogram of the sample is taken by GPC, and the number average molecular weight $\bar{M}n$ and the weight average molecular weight $\bar{M}w$ of the sample are calculated as polyethylene by the procedure (1) above, and the $\bar{M}w/\bar{M}n$ value is determined. The sample preparation conditions and the GPC measurement conditions at this time are as follows.

Sample Preparation (a) Take the sample together with an o-di-chlorobenzene solvent in an Erlenmeyer flask so that its concentration is 0.1% by weight.

(b) Heat the flask to 140° C. and for about 30 minutes

GPC Measurement Conditions

The GPC measurement was conducted under the following conditions.

(a) Device: 150C-ALC/GPC made by Waters Co.
(b) Column: GMH type made by Toyo Soda Co., Ltd.
(c) Amount of the sample: 400 microliters
(d) Temperature: 140° C.
(e) Flow rate: 1 ml/min.

The amount of an n-decane-soluble portion in the copolymer (as the amount of the soluble portion is smaller, the narrower is the composition distribution) was measured by adding about 3 g of the copolymer to 450 ml of n-decane, dissolving the copolymer at 145° C., cooling the solution to 23° C., removing the n-decane-insoluble portion by filtration, and recovering the n-decane-soluble portion from the filtrate.

The B value of the ethylenic copolymer of the present invention is defined as follows:

$$B = \frac{P_{OE}}{2P_O \cdot P_E}$$

wherein $P_E$ represents the molar fraction of the ethylene component in the copolymer, $P_O$ represents the molar fraction of the alpha-olefin component, and $P_{OE}$ represents the molar fraction of the alpha-olefin/ethylene sequence in the total dyad sequence.

The B value is an index showing the state of distribution of the individual monomer components in the copolymer chain and is calculated by determining $P_E$, $P_O$ and $P_{OE}$ in the above definition in accordance with the papers of G. J. Ray [Macromolecules, 10, 773 (1977)], J. C. Randall [Macromolecules, 15, 353 (1982), J. Polymer Science, Polymer Physics Ed., 11, 275 (1973)], and K. Kimura [Polymer, 25, 441 (1984)]. As the B value is larger, the amount of block-like sequences is smaller and the distribution of ethylene and the alpha-olefin is more uniform. Thus, the copolymer has a narrower composition distribution.

The B value is determined as follows: About 200 mg of the copolymer is uniformly dissolved in 1 ml of hexachlorobutadiene in a sample tube having a diameter of 10 mm, and a $^{13}$C-NMR spectrum of the sample is taken usually at a temperature of 120° C. under the following conditions.

Measuring frequency: 25.05 MHz
Spectral width: 1,500 Hz
Filter width: 1,500 Hz
Pulse repeating time: 4.2 sec
Pulse width: 7 microseconds
Number of integrations: 2,000 to 5,000

From the spectrum, $P_E$, $P_O$ and $P_{OE}$ are determined, and the B value is calculated from them.

EXAMPLE 1

Preparation of Catalyst Component (B)

A 400-ml flask purged fully with nitrogen was charged with 37 g of $Al_2(SO_4)_3 \cdot 14H_2O$ and 125 ml of toluene. The flask was cooled to 0° C., and 500 millimoles of trimethylaluminum diluted with 125 ml of toluene as added dropwise. The mixture was heated to 40° C., and the reaction was continued at this temperature for 10 hours. After the reaction, the reaction mixture was subjected to solid-liquid separation by filtration. Toluene was removed from the filtrate to obtain 13 g of an aluminoxane as a white solid. It had a molecular weight, as determined by freezing point depression in benzene, of 930. Its m value in the catalyst component [B] was 14.

Preparation of Catalyst Component (C)

A 400-ml flask purged fully with nitrogen was charged with 4.9 g of $Al_2(SO_4)_3 \cdot 14H_2O$ and 125 ml of toluene. The flask was cooled to 0° C., and 200 millimoles of triisobutylaluminum diluted with 125 ml of toluene was added dropwise. The mixture was heated to 40° C., and the reaction was continued at this temperature for 24 hours. After the reaction, the reaction mixture was subjected to solid-liquid separation by filtration. The filtration portion as used in polymerization. The solvent was removed from the filtrate under reduced pressure to obtain a product. The product had a molecular weight, as determined by freezing point depression in benzene, of 610.

Polymerization 500 ml of toluene was fed into a glass autoclave having an internal volume of 1 liter and fully purged with nitrogen, and a mixed gas consisting of ethylene and propylene (120 liters/hr and 80 liters/hr, respectively) was passed through the autoclave and left to stand at 20° C. for 10 minutes. Then, 0.25 milligram-atom, as Al atom, of the catalyst component (C) and 0.25 milligram-atom, as Al atom, of the catalyst component (B) were added. Subsequently, $2.5 \times 10^{-3}$ millimole of bis(cyclopentadienyl)zirconium dichloride was added, and polymerization was started. The mixed gas consisting of ethylene and propylene was continuously fed, and polymerized at 20° C. for 30 minutes under atmospheric pressure. After the polymerization, a small amount of methanol was added to stop the polymerization. The polymer solution was poured into a large excess of methanol to precipitate the polymer. The precipitated polymer was dried at 130° C. for 12 hours under reduced pressure. There was consequently obtained 15 g of a polymer having an MFR of 0.35 g/10 min., an ethylene content, as measured by $^{13}$C-NMR, of 82.9 mole %, an $\overline{Mw}/\overline{Mn}$ of 2.35 and a B value of 1.12.

EXAMPLE 2

Preparation of Catalyst Component (C)

Preparation of catalyst component (C) was conducted under the same conditions as in Example 1 except that the amount of $Al_2(SO_4)_3 \cdot 14H_2O$ was changed from 4.9 g to 4.25 g and the reaction time was changed from 24 hours to 5 hours. After the reaction, the reaction mixture was subjected to solid-liquid separation by filtration. The filtrate portion was used in polymerization. The solvent was removed from the filtrate under reduced pressure to obtain a product. The product had a molecular weight, as determined by freezing point depression in benzene, of 440.

Polymerization

Polymerization was conducted under the same conditions as in Example 1 to obtain 13 g of a polymer having an MFR of 0.30 g/10 min., an ethylene content, as measured by $^{13}$C-NMR, of 82.1 mole %, an $\overline{Mw}/\overline{Mn}$ of 2.32 and a B value of 1.14.

EXAMPLES 3 TO 5 AND COMPARATIVE EXAMPLE 1

Preparation of Catalyst Component (C)

Preparation of catalyst component (C) was conducted under the same conditions as in Example 1 except that the triisobutylaluminum used in Example 1 was changed to tri(2-methylpentyl)aluminum, tri(2-ethylhexyl)aluminum, isoprenylaluminum and tri-n-butylaluminum.

Polymerization

Polymerization was conducted in the same conditions as in Example 1. The results are shown in Table 1.

TABLE 1

| Example or Comparative Example | Preparation of catalyst component (C) | Result of polymerization | | | | |
|---|---|---|---|---|---|---|
| | | Yield g | MFR g/10 min. | Ethylene content mole % | $\overline{Mw}/\overline{Mn}$ | B value |
| Example 3 | Tri(2-methylpentyl)aluminum | 14.5 | 0.34 | 82.0 | 2.25 | 1.13 |
| Example 4 | Tri(2-ethylhexyl)aluminum | 14.8 | 0.30 | 80.6 | 2.06 | 1.15 |
| Example 5 | Isoprenylaluminum | 10.2 | 0.53 | 83.0 | 2.28 | 1.12 |
| Comparative Example 1 | Tri-n-butylaluminum | 0.5 | — | — | — | — |

EXAMPLE 6

Polymerization 250 ml of hexane and 750 ml of 4-methyl-1-pentene were fed into a stainless steel autoclave having an internal volume of 2 liters and fully purged with nitrogen. The contents in the autoclave was heated to 35° C. Then, the catalyst component (B) of Example 1, the catalyst component (C) of Example 2 and bis(cyclopentadienyl)zirconium dichloride were fed into the autoclave in amounts of 0.5 milligram-atom, 0.5 milligram-atom (both as Al atom) and 0.001 millimole, respectively. Subsequently, ethylene was introduced and polymerization was started. Ethylene was continuously fed so that the total pressure was maintained at 8 kg/cm²G. The polymerization was conducted at 45° C. for 1 hour. After the polymerization, a small amount of methanol was added to stop the polymerization. Then, the whole reaction mixture was poured into a large excess of methanol to recover a polymer. The crude polymer was dried at 80° C. for 12 hours under reduced pressure to obtain a polymer. The yield was 30.1 g. The polymer had an MFR of 0.24 g/10 min., a density of 0.901 g/cm² and an $\overline{Mw}/\overline{Mn}$ of 2.75. The weight fraction of the decane-soluble portion at room temperature in the polymer was 1.8% by weight.

EXAMPLE 7

Polymerization 500 ml of toluene was fed into a stainless steel autoclave having an internal volume of 2 liters and fully purged with nitrogen. Then, the catalyst component (B) and the catalyst component (C) prepared in Example 1 were fed into the autoclave in amounts, as Al atom, of 1 milligram-atom and 2 milligram-atoms, respectively. Thereafter, 250 ml of liquid propylene as fed into the system. Subsequently, 0.001 millimole of ethylene(bisindenyl)zirconium dichloride was added at −10° C., and polymerization was conducted at −10° C. for 6 hours. After 6 hours, a small amount of methanol was added to the system to stop the polymerization. Propylene was removed by reducing the pressure from the polymerization system. The resulting toluene slurry of polymer was poured to a large amount of methanol to recover a polymer. The crude polymer was dried at 80° C. under reduced pressure to obtain 48.1 g of a polypropylene. It had a viscosity [η], as measured in decalin at 135° C., of 0.97 dl/g.

EXAMPLE 8

Polymerization 500 ml of hexane and 500 ml of 4-methyl-1-pentene were fed into a stainless steel autoclave having an internal volume of 2 liters and fully purged with nitrogen. The contents in the autoclave was heated to 55° C. Then, the catalyst component (C) of Example 2 was fed into the autoclave in an amount of 1 milligram-atom as Al atom. There was further fed into the autoclave 0.25 ml of a toluene solution obtained by contacting the catalyst component (B) of Example 1 and bis(cyclopentadienyl)zirconium dichloride of respective concentrations of 0.4 gram-atom/liter as Al atom and 0.012 gram-atom/liter as Zr atom at 20° C. for 30 minutes. Thereafter, ethylene was introduced and polymerization was started. Ethylene was continuously fed so that the total pressure was maintained at 7 kg/cm², and the polymerization was conducted at 60° C. for 1 hour. After the polymerization, a small amount of methanol was added to stop the polymerization. The reaction mixture was poured into a large excess of methanol to recover a polymer. The crude polymer was dried at 80° C. for 12 hours under reduced pressure to obtain a polymer. The yield was 33.6 g. The polymer had an MFR of 0.18 g/10 min., a density of 0.903 g/cm² and an $\overline{Mw}/\overline{Mn}$ of 2.83. The weight fraction of the decane-soluble portion at room temperature in the polymer was 1.3% by weight.

We claim:

1. A process for polymerizing olefins comprising polymerizing or copolymerizing olefins in the presence of a catalyst composed of (A) a compound of a transition metal of the formula $$R^1_k R^2_l R^3_m R^4_n Me$$

wherein $R^1$ represents a cycloalkadienyl groups, $R^2$, $R^3$ and $R^4$ are identical or different and each represents a cycloalkadienyl group, an aryl group, an alkyl group, an aralkyl group, a halogen atom or a hydrogen atom or a compound of the above formula wherein $R^1$ and one of $R^2$, $R^3$ or $R^4$ are indenyl, substituted indenyl or partially hydrogenated indenyl in which said indenyl groups are bonded to each other via a lower alkylene group, Me represents zirconium, $k \geq 1$, and $k+l+m+n=4$, (B) an aluminoxane produced from trimethylaluminum, and (C) an aluminoxane wherein at least on e hydrocarbon group other than n-alkyl groups is bonded to an aluminum atom, said hydrocarbon group being selected from the class consisting of branched alkyl groups, cycloalkyl groups and aryl groups.

2. The process set forth in claim 1, wherein the aluminoxane produced from trimethylaluminum is represented by the following formula (II)

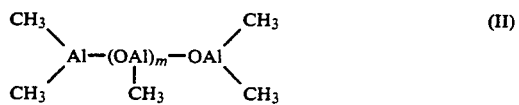

wherein m is a number of 2 or larger, or the following formula (III)

wherein m has the same definition as given above.

3. The process set forth in claim 1, wherein the compound (A) is used in such an amount that the concentration of the transition metal of said compound in the polymerization reaction system is $10^{-8}$ to $10^{-2}$ gram-atom/liter.

4. The process set forth in claim 1, wherein the aluminoxane (B) is used in such an amount that the concentration of the aluminum atom of the aluminoxane (B) in the polymerization reaction system is 3 milligram-atoms/liter or below.

5. The process set forth in claim 1, wherein the aluminoxane (C) is used in such a proportion that the amount of the aluminum atom of the aluminoxane (C) is 20–95% of the total amount of the aluminum atoms of the aluminoxane (C) and the aluminoxane (B).

6. The process as set forth in claim 1 wherein the zirconium compound is bis(cyclopentadienyl)zirconium dichloride or ethylene bis(indenyl)zirconium dichloride.

7. The process as set fort in claim 1 wherein the at least one hydrocarbon group other than n-alkyl groups bonded to an aluminum atom in the aluminoxane (C) is a branched alkyl group.

8. The process as set froth in claim 1 wherein the at least one hydrocarbon group other than n-alkyl groups bonded to an aluminum atom in the aluminoxane (C) is a cycloalkyl group.

9. The process as set forth in claim 1 wherein the at least one hydrocarbon group other than n-alkyl groups bonded to an aluminum atom in the aluminoxane (C) is an aryl group.

10. The process as set forth in claim 1 wherein the aluminoxane (C) is produced from a tri-(branched alkyl)aluminum.

11. The process as set forth in claim 1 wherein the compound (A) is used in such an amount that the concentration of the transition metal of said compound in the polymerization reaction system is $10^{-8}$ to $10^{-2}$ gram-atom/liter; the aluminoxane (B) is used in such an amount that the concentration of the aluminum atom of the aluminoxane (B) in the polymerization reaction system is 3 milligram-atoms/liter or below; and wherein the aluminoxane (C) is used in such a proportion that the amount of the aluminum atom of the aluminoxane (C) is 20–95% of the total amount of the aluminum atoms of the aluminoxane (C) and the aluminoxane (B).

12. The process as set forth in claim 1 wherein the compound (A) is used in such an amount that the concentration of the transition metal of said compound in the polymerization reaction system is $10^{-7}$ to $10^{-3}$ gram-atom/liter; the aluminoxane (B) is used in such an amount that the concentration of the aluminum atom of the aluminoxane (B) in the polymerization reaction system is 0.02 to 1 milligram-atoms/liter and wherein the aluminoxane (C) is used in such a proportion that the amount of the aluminum atom of the aluminoxane (C) is 30–85% of the total amount of the aluminum atoms of the aluminoxane (C) and the aluminoxane (B).

13. The process as set forth in claim 1 for homopolymerizing ethylene.

14. The process as set forth in claim 1 for copolymerizing ethylene with an alpha-olefin of form 3 to 20 carbon atoms.

15. The process as set forth in claim 1 wherein the olefin polymerization is conducted in the gas-phase.

16. The process as set forth in claim 1 wherein the olefin polymerization is carried out in the liquid-phase.

17. The process as set forth in claim 1 wherein the polymerization is carried out at a temperature of from −50° to 200° C.

18. The process as set forth in claim 1 wherein the polymerization is carried out at a temperature of from 0° to 120° C.

* * * * *